I. M. Rose.
BEST AVAILABLE COPY
Guide & Hemmer.
No 3218 Fig: 1. Reissued Dec. 1, 1868.
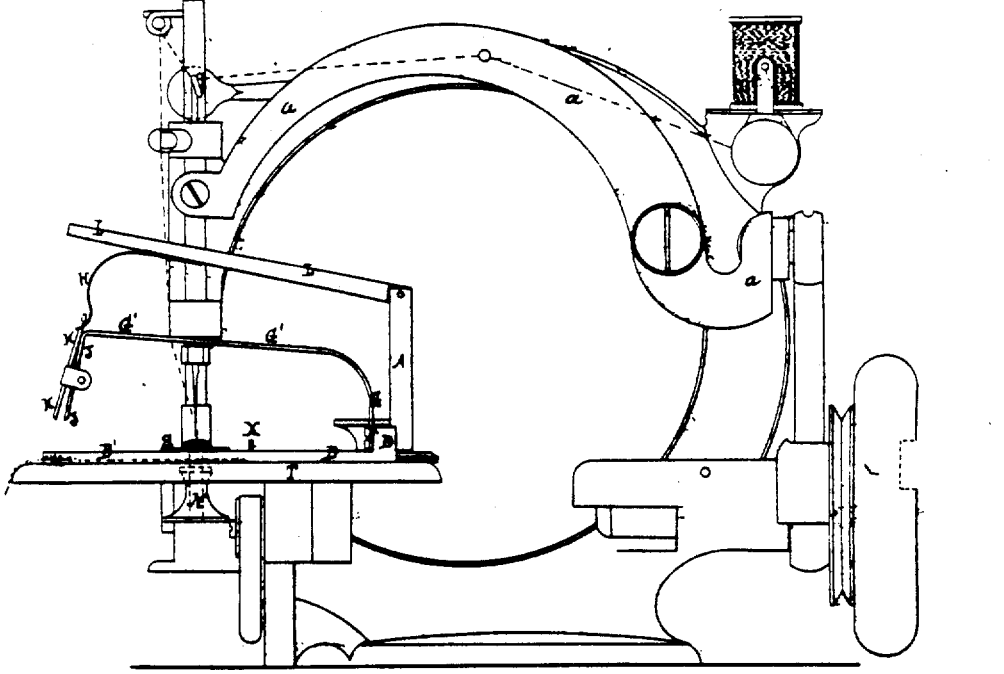
Fig: 4.
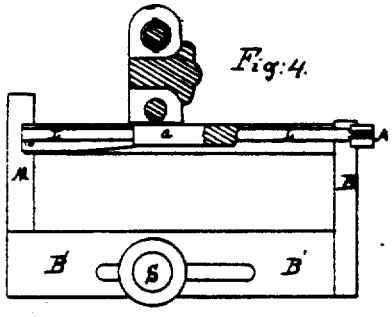
Fig: 2.
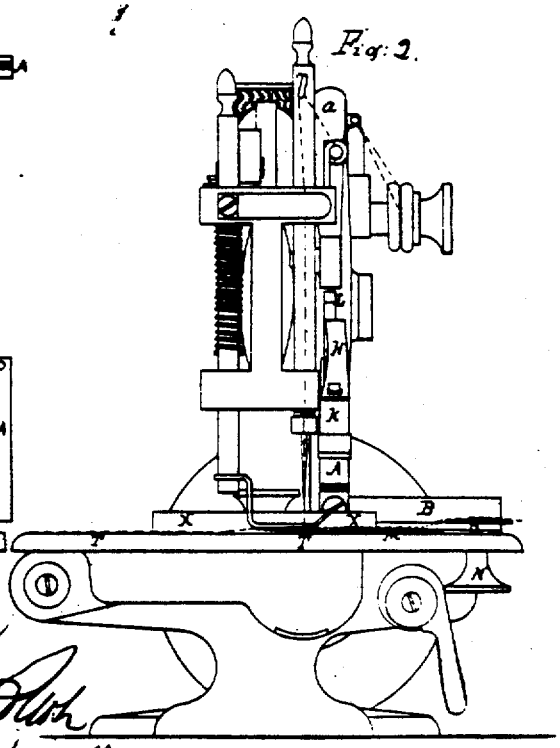
Fig: 3.
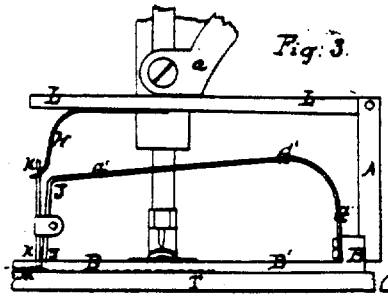
Witnesses
Wm. H. Harrison
Wm. F. Brooks
I. M. Rose
By A. Pohl
his atty.

UNITED STATES PATENT OFFICE.

HENRY W. FULLER, OF BROOKLYN, NEW YORK, ASSIGNEE, BY MESNE ASSIGNMENTS, OF ISRAEL M. ROSE.

IMPROVEMENT IN TUCK-CREASING ATTACHMENTS FOR SEWING-MACHINES.

Specification forming part of Letters Patent No. 40,084, dated September 22, 1863; reissue No. 3,218, dated December 1, 1868.

*To all whom it may concern:*

Be it known that ISRAEL M. ROSE, of the city, county, and State of New York, did invent an Improved Tuck Marker or Creaser; and the following is a full, clear, and exact description of the same, reference being had to the accompanying drawing, which forms part of this specification.

Previous to this invention fabrics were marked or creased by means of a protuberance or point and a notch or indentation caused to impinge upon the fabric from opposite sides thereof. That mode of marking or creasing is open to the objection that fine goods will sometimes be cut by the marking operation, while on heavy or flimsy goods the crease is often insufficiently defined, which notch and point are separately adjustable to each other, as well as to the sewing-machine needle.

By the invention herein described marks or ridges (and obversely creases) are formed in the fabric by a succession of nips or pinches thereof, while it has motion imparted to it in line with the crease in any convenient manner, but usually the feed mechanism of a sewing-machine, for which it is intended to be used as an attachment; and said process of nipping or pinching is designed to obviate the objections aforesaid, which are attached to other tuck-markers and produce a more efficient instrument.

The said invention comprises the use of jaws, which are caused to descend with more or less force or pressure on the fabric while open, and then in being closed are capable of seizing a portion of such fabric and compressing the same tightly, such fabric being properly supported against the force of said jaws, and which operation, being repeated while the fabric is moved along, produces the required ridge or crease, in line of which the fabric will naturally fold to facilitate the forming of a tuck or tucks; and said invention also comprises certain details of construction, arrangement, and combination to adapt tuck-markers for use in connection with sewing-machines, and forming a tuck-creasing mechanism having an upper and under part connected, and together adjustable as to its relation with the needle of a sewing-machine, and operated by a sewing-machine.

To enable others skilled in the art to make and use this invention, an apparatus will now be described constructed and acting in conformity with the principles thereof.

In the accompanying drawing, Figure 1 is a side elevation of the improved apparatus for creasing fabrics as attached to a sewing-machine. Fig. 2 is a front view of the same. Fig. 3 is a side view, showing part of a sewing-machine and the apparatus in action. Fig. 4 is a top view of Fig. 3.

The marks of reference correspond in all the figures.

B is a base-plate, having an upright standard, A, firmly secured thereto, so as to form a permanent part thereof. To the upper end of the standard is jointed a lever, L, which carries a spring-branch, H. Said branch is buckled at its lower end with a blade, K, which forms one of the jaws for seizing and crimping the fabric. The use of the lever jointed as aforesaid insures freedom of motion to and from the fabric, while the stiffness of the lever prevents any lateral motion of the creasing device J K. The lever is also designed to receive the force of the arm or other moving part of the sewing-machine, and transmit said motion directly to the jaws through the spring-branch H. The bed-plate B′ has a small upright projection, B, to which is permanently fixed a spring-blade, G′, having its front end bent downward at J, and forms a mate to the jaw R. These jaws are hinged together at *v*, and their lower ends are sharp or serrated, in order more readily to seize the fabric.

The object of the spring G is to cause the marking device to react after such creasing action, and follow the upward motion of the needle-arm, in order to give room for the free insertion and removal of the work, and the spring-branch H, as seen in that figure, is made to hold the outer jaw K away from the inner one, J, when in the normal position there shown.

It is important to have the creasing action take place as nearly as possible in front of the needle—that is, in line with the arm of the sewing-machine. Therefore there is one extension-plate, M, extending out laterally from the base-plate B, in line with the movement of the feeding device *q;* and said plate supports the material immediately under the jaws, and receives the impinging action of said jaws thereon. This arrangement provides for bringing the creasing devices around or across the presser-foot *q'*, and for performing the creasing operation in the proper location with respect to the needle.

The movement of the parts is essentially as follows: When the lever L is moved downward toward the base-plate the jaws will press any material lying on the bed M or T hard against it; then, the downward movement of the lever L being continued, the jaws close upon, gather, and double up the fabric, compressing it between them.

From the above description it will be apparent that this apparatus employs upper and under devices on opposite sides of the cloth, to act together conjointly and produce creases in the fabric.

To use the apparatus in connection with a sewing-machine it is secured to the bed or cloth plate T of the machine by a screw, N, which passes through the slot *m'* in the base-plate B'. In some cases, by so shaping the parts of the apparatus, the ordinary gage-screw S may be used.

The several parts of the apparatus are so arranged, relatively, that when properly secured the lever L is immediately under the arm *a* of the sewing-machine, and when the machine is operated said arm will strike the lever L and actuate the creaser or tucker.

To do tucking on the apparatus with a sewing-machine, a fold is first made in the fabric by hand, and the gage X is fastened by means of the set-screw *s*, to make the seam the proper distance from the edge of the required tuck. The apparatus is then adjusted, by means of the screw N and slot *m'*, in such relation to the needle *p* that the distance from the needle to the jaws is at least double the distance between the needle and the gage L. The jaws (or upper part of the tucker) being permanently connected with the base-plate, (or under part,) such parts sustain a fixed relationship to each other, and hence one movement or alteration of either part simultaneously adjusts the relative position of the whole tucker with respect to the needle.

When adjusted as required the fabric is placed in the machine, with the folded edge against the gage X, and the machine started. The lever L, when depressed by the arm *a* of the sewing-machine, carries down the spring-branch H, and with it the jaws K and J, to the surface of the fabric lying on the bed-plate of the tucker or sewing-machine. The bed-plate, supporting the fabric immediately under the jaws, resists the impingement of the jaws thereon, and arrests their downward movement, while, the same motion of the arm *a* being continued, the jaws close, gathering up a portion of the fabric and pinching it. At this juncture it may happen that the downward stroke of the arm *a* may be a little more than sufficient merely to complete the pinching or marking of the fabric, and in such event the spring-branch H yields enough to comply with such surplus motion of the arm *a* aforesaid, and mollifies and relieves any straining of the sewing-machine, easing the operation. On the upward motion of the arm *a* the jaws rise and open by the elasticity of the spring-branch H and spring G, while the fabric is advanced by the feed mechanism of the sewing-machine. The arm *a* then again descends, the pinching process is again repeated, and thus, as the cloth is fed through the machine, a clear and well-defined ridge is formed on the fabric by the creaser at the same time that a seam has been sewed in the folded part thereof, forming a tuck. The cloth is next removed from the machine and folded on the line of the ridge or crease. As the work is proceeded with, and each time a tuck is sewed by the machine, the ridge or crease for the next tuck is made.

It will be observed that in the adjustment of the tucker in line with the slot *m'* the arm of the machine will act on the lever L at different points on the length of said lever, according to the width of tuck being formed. The application of the force of said arm is invariably made, however, directly to or over the creasing device at the end of said lever, no matter at what point on said lever the force of the sewing-machine may be received. The result is, enhanced uniformity of action of the creasing mechanism under all conditions and adjustments incident to its successful use.

For communicating motion from the sewing-machine to the tucker any mode common to the art may be used.

Having thus described the invention of ISRAEL M. ROSE, what I claim is—

1. The machine, substantially such as herein described, for forming a ridge or ridges on fabrics, to be afterward folded in the line of such ridges.

2. The method of nipping or pinching the fabric to form ridges or creases thereon, as aforesaid, by means of jaws opened and closed at intervals to seize and pinch the fabric when at rest, and then release it as the same is moved along intermittently by a suitable feeding mechanism, as set forth.

3. The combination, with jaws arranged, as aforesaid, for action on a fabric, of a bed plate or plates to support the fabric receiving and resisting the impingement of the jaw or jaws thereon, substantially as specified.

4. A pinching mechanism, substantially as set forth, and in which the jaws are brought down in contact with, and made to impinge upon, the fabric while yet open, and are closed by the resistance then offered to the further descent of the jaws, substantially as described.

5. The combination of the creasing device or devices of a tuck-marker with a jointed lever, substantially as and for the purposes set forth.

6. A tuck-creasing mechanism, substantially such as described, having its upper and lower parts connected, and together adjustable as to its relation with the needle of a sewing-machine, and operated by the sewing-machine, substantially as set forth.

7. The spring G, for carrying the upper half of the creasing device away from the cloth after each creasing action, when relieved by the needle-arm, substantially as set forth.

8. The combination, with a tuck-marker, having upper and under parts connected, and together adjustable, as specified, of the lever and spring, substantially as and for the purpose set forth.

HENRY W. FULLER,
*Assignee of Israel M. Rose.*

Witnesses:
E. B. BARNUM,
EARLE H. SMITH.